July 26, 1938.  W. R. TALIAFERRO  2,125,055

CONTROL SYSTEM

Filed April 24, 1935  3 Sheets-Sheet 1

WITNESSES:

INVENTOR
William R. Taliaferro.
BY
ATTORNEY

July 26, 1938.  W. R. TALIAFERRO  2,125,055
CONTROL SYSTEM
Filed April 24, 1935  3 Sheets-Sheet 2

WITNESSES:

INVENTOR
William R. Taliaferro.
BY
ATTORNEY

July 26, 1938.    W. R. TALIAFERRO    2,125,055
CONTROL SYSTEM
Filed April 24, 1935    3 Sheets-Sheet 3

WITNESSES:
C. J. Weller
H. S. Chilcott

INVENTOR
William R. Taliaferro.
BY G. M. Crawford
ATTORNEY

Patented July 26, 1938

2,125,055

UNITED STATES PATENT OFFICE 2,125,055

CONTROL SYSTEM

William R. Taliaferro, Pittsburgh, Pa., assignor to Westinghouse Electric & Manufacturing Company, East Pittsburgh, Pa., a corporation of Pennsylvania Application April 24, 1935, Serial No. 17,969

3 Claims. (Cl. 171—229)

My invention relates, generally, to control systems, and, more particularly, to systems for controlling the operation of electric motors.

An object of my invention, generally stated, is to provide a motor control system which shall be simple and efficient in operation and which may be economically manufactured and installed.

A more specific object of my invention is to provide a relay for controlling the operation of an electric motor which shall be responsive to the speed of the motor.

Another object of my invention is to provide for remotely varying the setting of a speed-responsive relay.

A further object of my invention is to provide a system for regulating the speed of an electric motor.

A still further object of my invention is to prevent hunting of a speed regulating system.

Other objects of my invention will be explained fully hereinafter or will be apparent to those skilled in the art.

For a fuller understanding of the nature and objects of my invention, reference may be had to the following detailed description taken in conjunction with the accompanying drawings, in which.

Figure 1:
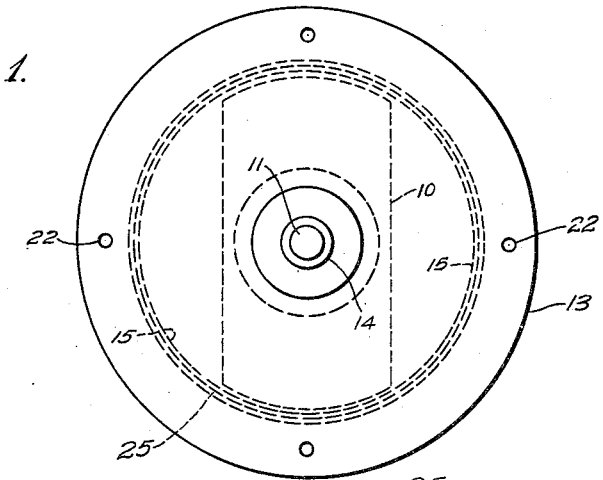
Figure 1 is a view, in elevation, of a speed-responsive relay constructed in accordance with my invention.
Figure 2:
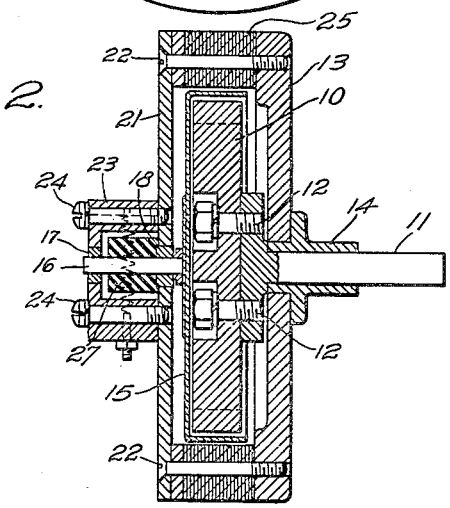
Fig. 2 is a view, in section, of the relay shown in Fig. 1.
Figure 3:
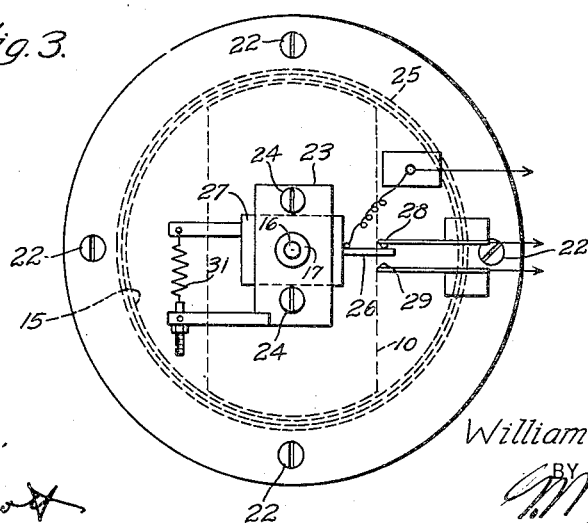
Fig. 3 is another view, in elevation, of the relay illustrated in Figs. 1 and 2.

Referring now to the drawings and particularly to Figs. 1, 2 and 3, the speed-responsive relay shown therein is of the magnetic drag type and comprises a rotating magnet 10 which is mounted on the end of a shaft 11 by means of stud bolts 12. The shaft 11 is rotatably supported in a frame member 13 by a sleeve bearing 14 and the shaft may be either directly connected or geared to an electric motor, locomotive axle or other rotating apparatus, whose speed it is desired to regulate or utilize as a means of controlling the operation of other equipment.

As shown, the magnet 10 is disposed inside of a cup 15, which may be composed of aluminum, copper or other non-magnetic material. The cup 15 is concentric with the magnet 10, and is carried by a short shaft 16 which is mounted in bearings 17 and 18. The bearing 18 is supported by a frame member 21, which is secured to the frame member 13 by screws 22, and the end bearing 17 is supported by a bracket 23, secured to the frame member 21 by screws 24. A laminated steel ring 25, which surrounds the magnet 10 and the cup 15, is clamped between the frame members 13 and 21, thereby providing a magnetic circuit for the flux of the magnet 10.

As will be readily understood, eddy currents are produced in the cup 15 and the rotation of the magnet 10 produces a magnetic drag or torque on the cup, the torque being approximately proportional to the speed of rotation of the magnet 10. However, complete rotation of the cup 15 is prevented by a contact arm 26, which is carried by a contact block 27 secured to the shaft 16. The contact arm 26 is disposed between fixed contact members 28 and 29, which are mounted on the stationary frame members. A calibrating spring 31 is disposed to oppose the torque on the cup 15, thereby biasing the contact arm 26 against the upper contact member 28 when the rotating magnet 10 is driven below a predetermined speed. When the torque produced by the magnet 10 on the cup 15 is sufficient to overcome the force of the spring 31, the contact arm 26 is actuated into engagement with the contact member 29. Therefore, it will be seen that the device is responsive to the speed of the apparatus driving the rotating magnet 10 and that it may be utilized as a speed relay and also as a speed regulator, as will be more fully explained hereinafter.

Figure 4:
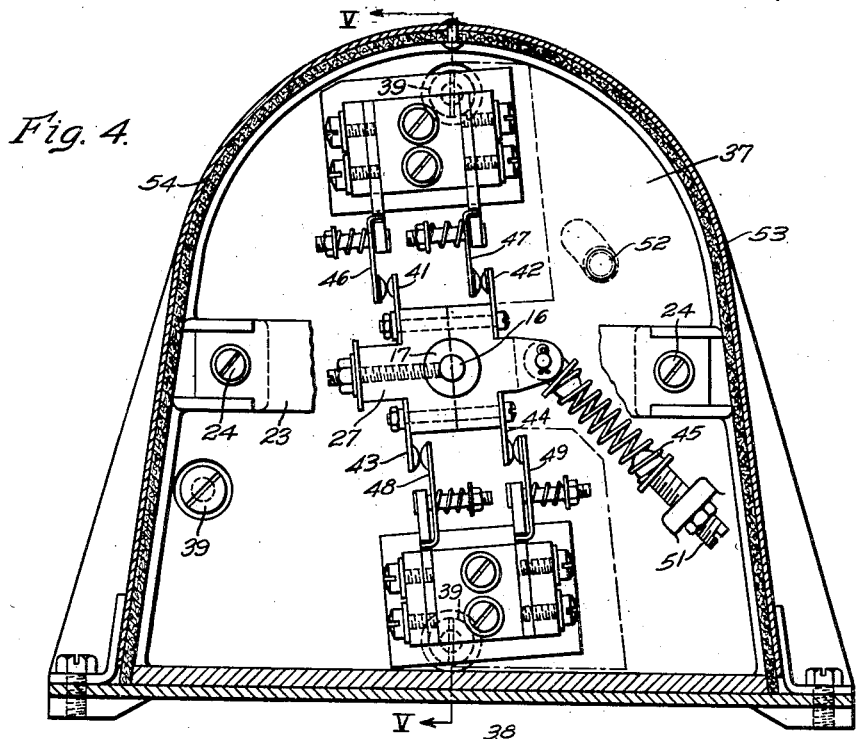
Fig. 4 is a view, partly in section and partly in elevation, of a modification of the relay shown in Figs. 1, 2 and 3.
Figure 5:
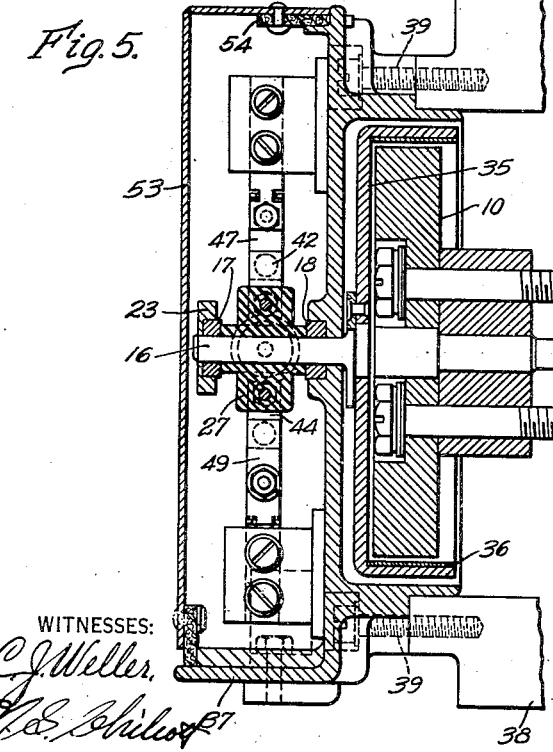
Fig. 5 is a view, in section, taken along the line V—V of Fig. 4.

In the modification of the relay shown in Figs. 4 and 5, the laminated ring 25 is omitted and a cup 35 composed of a magnetic material, such as steel, is utilized, thereby providing a path for the magnetic flux produced by the rotating magnet 10. A thin layer 36 of copper, or other non-magnetic material, is disposed on the inside of the rim of the cup 35. Thus the laminated ring 25 and cup 15, in the structure shown in Figs. 1, 2 and 3, are combined into a single member, thereby simplifying the structure.

The cup 35 is carried by the shaft 16, rotatably mounted in a supporting frame 37, which may be bolted onto an end bracket 38 of an electric motor by stud bolts 39. The magnet 10 may be secured to the end of the motor shaft (not shown) by stud bolts 40, the magnet shaft 11 being disposed at the center of the motor shaft. In this manner the relay may be rigidly secured to an electric motor, or other apparatus having a rotating shaft, the relay magnet being driven at the same speed as the shaft of the motor.

As shown in Fig. 4, the contact members 41, 42, 43 and 44 are carried by the contact block 27, which is secured to the shaft 16 of the cup 35 and actuated thereby. The contact members 41, 42, 43 and 44 are normally biased by a compression spring 45 into engagement with contact members 46, 47, 48 and 49, respectively, which are resiliently mounted on the stationary frame 37.

The spring 45 functions similarly to the spring 31 to oppose the torque on the cup 35 and bias the contact members of the relay to predetermined positions. The spring may be calibrated by means of an adjusting screw 51, thereby varying the speed at which the rotating magnet 10 must revolve in order to produce sufficient torque to overcome the spring and operate the cup 35. A stop member 52 is provided for limiting the travel of the cup 35. The relay is totally enclosed by a cover 53 for protection against moisture and dirt. Further protection is afforded by a felt liner 54.

Figure 6:
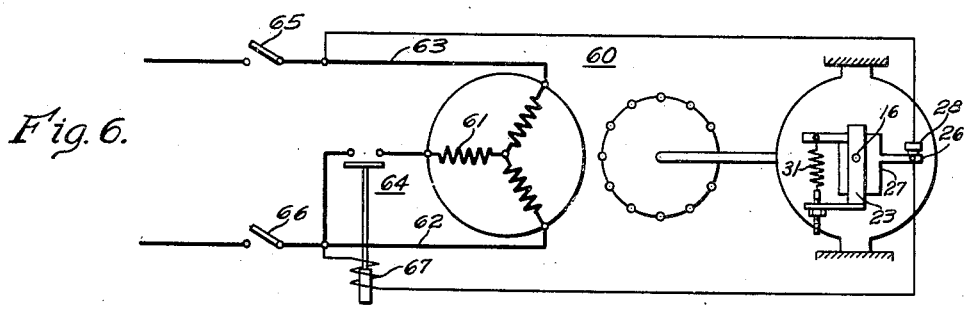
Figs. 6, 7 and 8 are diagrammatic views of control systems embodying my invention.

As illustrated in Fig. 6, the speed-responsive relay herein described may be utilized to open the circuit through the starting winding of a single-phase induction motor 60 when the motor has attained a predetermined speed. The motor 60 is provided with a starting winding 61 which may be connected across the power conductors 62 and 63 by means of a starting switch 64 to start the motor. When the line switches 65 and 66 are closed to connect the conductors 62 and 63 to any suitable source of alternating-current power, the actuating coil 67 of the starting switch 64 is energized through a circuit established by contact members 26 and 28 of the relay, which are biased to their closed position by the spring 31 on the speed-responsive relay.

As described hereinbefore, when the motor attains a predetermined speed, the torque developed by the relay is sufficient to overcome the force of the spring 31 and the contact members 26 and 28 are opened, thereby deenergizing the actuating coil 67 of the starting switch 64, which permits the switch to open and disconnect the starting winding 61 of the motor 60.

Centrifugally-operated switches have been utilized for this purpose and are fairly satisfactory on small motors. However, in view of mechanical difficulties encountered and the cost involved in building a satisfactory centrifugal switch for larger-sized motors, centrifugal switches have not been developed which are suitable for use on large motors. It is apparent that the speed-responsive relay herein disclosed may be utilized with a motor of any size, and that it may be built at a comparatively small cost. Furthermore, the speed setting of the relay may be readily adjusted by means of the calibrating spring 31, thereby permitting the relay to be calibrated to deenergize the starting winding at the most suitable speed for the particular motor being controlled by the relay.

Figure 7:
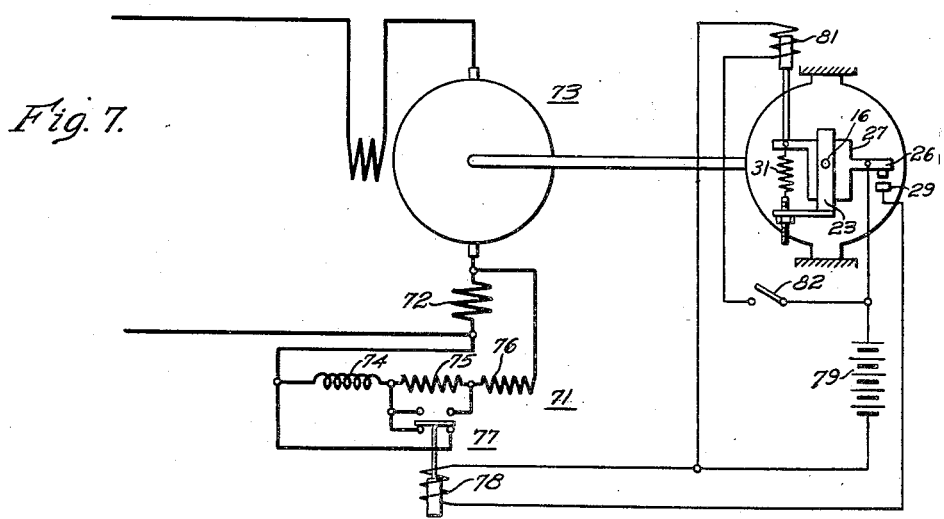

As shown in Fig. 7, the speed relay may also be utilized to control the relative values of resistance and reactance in a shunt 71 for the interpole winding 72 of an alternating-current motor 73, of the commutating type. In order that satisfactory commutation of the motor 73 may be obtained at various operating speeds, it is necessary to vary the relative values of resistance and reactance in the interpole shunt 71, as is fully described in Patent No. 1,922,724, issued August 15, 1933, to S. H. Cowin and L. J. Hibbard.

The shunt 71 includes a reactor 74 and resistors 75 and 76, which are connected in series circuit relation with the reactor 74. As shown, an electically-operated switch 77 is provided for short circuiting the reactor 74 when the switch 77 is in the deenergized position. When the actuating coil 78 of the switch 77 is energized, the reactor 74 is connected in the shunt circuit, and the resistor 75 is short circuited from the interpole shunt 71, thereby varying the relative values of resistance and reactance in the shunt for the interpole winding 72.

Assuming that the motor 73 is operating at a relatively low speed, the contact members 26 and 29 of the speed relay are separated by the spring 31 and the actuating coil 78 of the switch 77 is deenergized. When the motor 73 attains a predetermined speed, the contact members 26 and 29 are closed by the torque produced by the rotating magnet of the relay, as herein described, and the actuating coil 78 is connected across a battery 79, thereby energizing the coil and actuating the switch 77 to its uppermost position to change the relative values of resistance and reactance in the interpole shunt 71.

In order that the speed at which the relay operates may be remotely controlled a solenoid 81 is provided on the relay to oppose the spring 31, as shown in Fig. 7. It will be understood that when the solenoid 81 is energized, less torque will be required to overcome the force of the spring 31 and permit the contact members 26 and 29 to close. Therefore, the relay will function to operate the switch 77 at a lower speed of the motor 73 than when the solenoid 81 is deenergized. The solenoid 81 may be energized by closing a switch 82, which may be located at any suitable point, thereby permitting the speed setting of the relay to be remotely controlled.

Figure 8:
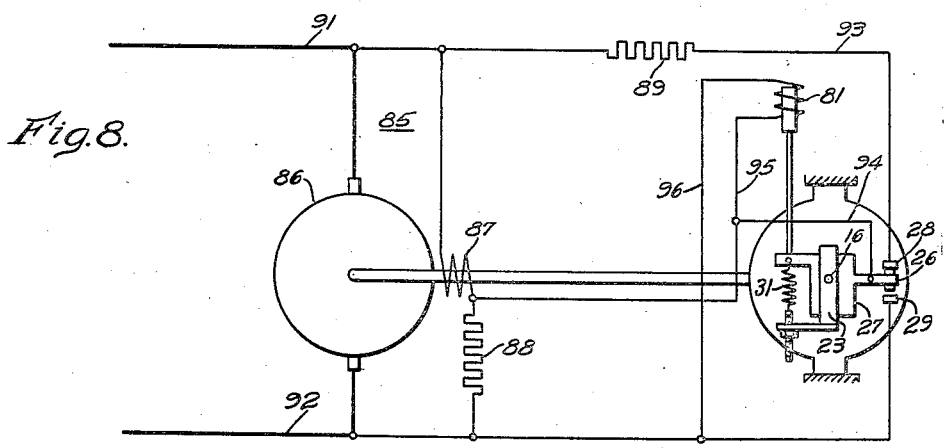

In the motor control system illustrated in Fig. 8, the relay herein described is utilized as a speed regulating device for controlling the operation of a shunt motor 85, which is provided with an armature winding 86 and a shunt field winding 87. As is well known in the art, the speed of an electric motor may be controlled by varying the current in the motor field winding. The relay is driven by the motor shaft, in the manner hereinbefore described, and the contact members of the relay are so connected in the motor circuit that the current in the shunt field winding 87 is decreased when the contact members 26 and 28 are closed by the spring 31, thereby causing the speed of the motor 85 to increase. Referring to Fig. 8, it will be seen that a resistor 88 is connected in series circuit relation with the field winding 87, and a resistor 89 is connected parallel to the field winding 87 when the contact members 26 and 28 of the relay are closed, which causes a minimum amount of current to flow through the field winding 87.

When the motor 85 attains a speed which will produce sufficient torque in the relay, in the manner hereinbefore described, to overcome the force of the spring 31 and open the contact members 26 and 28 and close the contact members 26 and 29, the resistor 88 is shunted and resistor 89 is disconnected from the shunt field circuit and the winding 87 is connected directly across the power conductors 91 and 92, thereby causing maximum current to flow through the shunt field winding, which will decrease the motor speed. The contact members 26 and 29 remain closed until opened by the spring 31, which will decrease the motor field current and cause the motor speed to increase when the cycle of operation is again repeated. In this manner, the relay may be utilized as a speed regulator to control the speed of the motor 85.

In order to prevent hunting or surging of the regulating system, the solenoid coil 81 may be connected either in series with or parallel to the resistor 88, as shown. Thus the coil 81 is energized when the contact members 26 and 28 are closed by the spring 31. The circuit through the coil 81 may be traced from the power conductor 91 through the resistor 89, conductor 93, contact members 28 and 26, conductors 94 and 95, the coil 81 and conductor 96 to the power conductor 92.

As the solenoid 81 opposes the spring 31 when energized, it will be seen that the solenoid 81 tends to prevent overshooting of the regulator, since it will cause the contact members 26 and 28 to open slightly before the motor has attained the maximum speed normally permitted by the regulator. Since the solenoid 81 is deenergized when the contact members 26 and 28 are opened by the torque produced in the relay as a result of the increased speed of the motor, the spring 31 is enabled to again close the contact members of the relay without having to overcome the force of the solenoid 81.

In this manner, the speed of the motor 85 is regulated by controlling the current in the field winding 87 by means of the resistors 88 and 89, which are alternately connected in and disconnected from the field winding circuit by means of the contact members on the speed regulating relay, and hunting of the regulating system is reduced by the action of the electrically energized solenoid 81.

From the foregoing description, it is apparent that I have provided a speed-repsonsive device which may be economically constructed and may be readily utilized as a speed relay to control the operation of numerous electrical or mechanical devices, and may also be utilized as a speed regulator to control the speed of electric motors of various types.

If desired, the relay may be modified to constitute a speed-responsive device having a time delay characteristic by permitting the cup member of the relay to rotate and drive a gear train loaded with a spring or friction load. In this manner contact members or mechanical trip devices may be operated in sequential relation by the relay within a predetermined time after the cup starts to rotate, thereby providing a time element after a certain speed is reached.

While I have illustrated the manner in which the speed-responsive device may be connected to and utilized with various electrical devices, it will be understood that it may be readily utilized in connection with mechanical apparatus, as well as electrical.

Since many modifications may be made in the apparatus and arrangement of parts without departing from the spirit of my invention, I do not wish to be limited other than by the scope of the appended claims.

I claim as my invention:

1. In a motor control system, in combination, an electric motor, a field winding for said motor, a speed-responsive relay having a rotating member driven by said motor, a rotatable member magnetically actuated by the rotating member, spring means for governing the movement of the rotatable member to control the current in the motor field winding, thereby regulating the speed of the motor, and electro-magnetic means controlled by said rotatable member to vary the effect of said spring means.

2. In a motor control system, in combination, an electric motor, a field winding for said motor, a speed-responsive relay having a rotating member driven by said motor, a rotatable member magnetically actuated by the rotating member, spring means for biasing the rotatable member to shunt the motor field, thereby regulating the speed of the motor, electro-magnetic means disposed to vary the effect of said spring means, and means actuated by said rotatable member for controlling the energization of said electro-magnetic means.

3. In a motor control system, in combination, an electric motor, a field winding for the motor, a speed-responsive relay having a rotating member driven by said motor, a rotatable member magnetically actuated by the rotating member to increase the motor field current, spring means for biasing the rotatable member to decrease the field current, thereby regulating the motor speed, electrically-energized means disposed to oppose the spring means to prevent hunting of the regulating system, and means actuated by said rotatable member for controlling the energization of said electrically energized means.

WILLIAM R. TALIAFERRO.